United States Patent [19]

Tedeschi

[11] 4,043,189

[45] Aug. 23, 1977

[54] ENGINE, CYLINDER IDENTIFICATION (CID) TRANSDUCER

[75] Inventor: Rinaldo Robert Tedeschi, Newington, Conn.

[73] Assignee: United Technologies Corporation, Hartford, Conn.

[21] Appl. No.: 684,221

[22] Filed: May 7, 1976

[51] Int. Cl.$^2$ .......................................... G01M 15/00
[52] U.S. Cl. .................................................. 73/117.3
[58] Field of Search .................... 73/116, 117.2, 117.3, 73/118, 119 A; 324/16 R, 161; 235/150.2, 150.3

[56] References Cited

U.S. PATENT DOCUMENTS

| 3,864,963 | 2/1975 | Rivere ................................... 73/117.3 |
| 3,942,365 | 3/1976 | Hanson et al. ......................... 73/116 |

Primary Examiner—Jerry W. Myracle
Attorney, Agent, or Firm—Dominic J. Chiantera

[57] ABSTRACT

In a combustion engine, such as a diesel engine, the periodic displacement of an engine component member having a cyclic function directly related to the piston stroke of an engine cylinder, is detected by a proximity sensor disposed adjacent to an area through which the component member is periodically displaced, the sensor providing a series of cylinder identification (CID) signal pulses having a peak amplitude in dependence on the spatial distance between the sensor and the member at that position in its displacement cycle at which it is in close proximity to the sensor, and having a period in dependence on the periodicity of the member displacement cycle, the occurrence of each CID signal pulse being directly related to, and representative of the piston stroke through a reference piston position. Each CID signal is detected and signal conditioned to provide a conditioned CID (CID*) signal and its complement ($\overline{CID^*}$) signal, the interval between the leading edges of each defining a CID interval over which a plurality of tooth signals, provided by proximity sensing of the ring gear teeth of the engine flywheel assembly, are counted to provide a total tooth count for the CID interval which is divided by two and stored for one full period of the sensor CID signal. The instantaneous tooth count provided during an immediately succeeding CID interval is continuously compared with the stored half tooth count from the preceding interval in a magnitude comparator, which provides a discrete output signal when the instantaneous tooth count from the succeeding CID interval exceeds the stored half tooth count from the immediately preceding CID interval, the leading edge of the discrete signal representing the displacement of the cylinder piston through the reference piston position.

4 Claims, 4 Drawing Figures

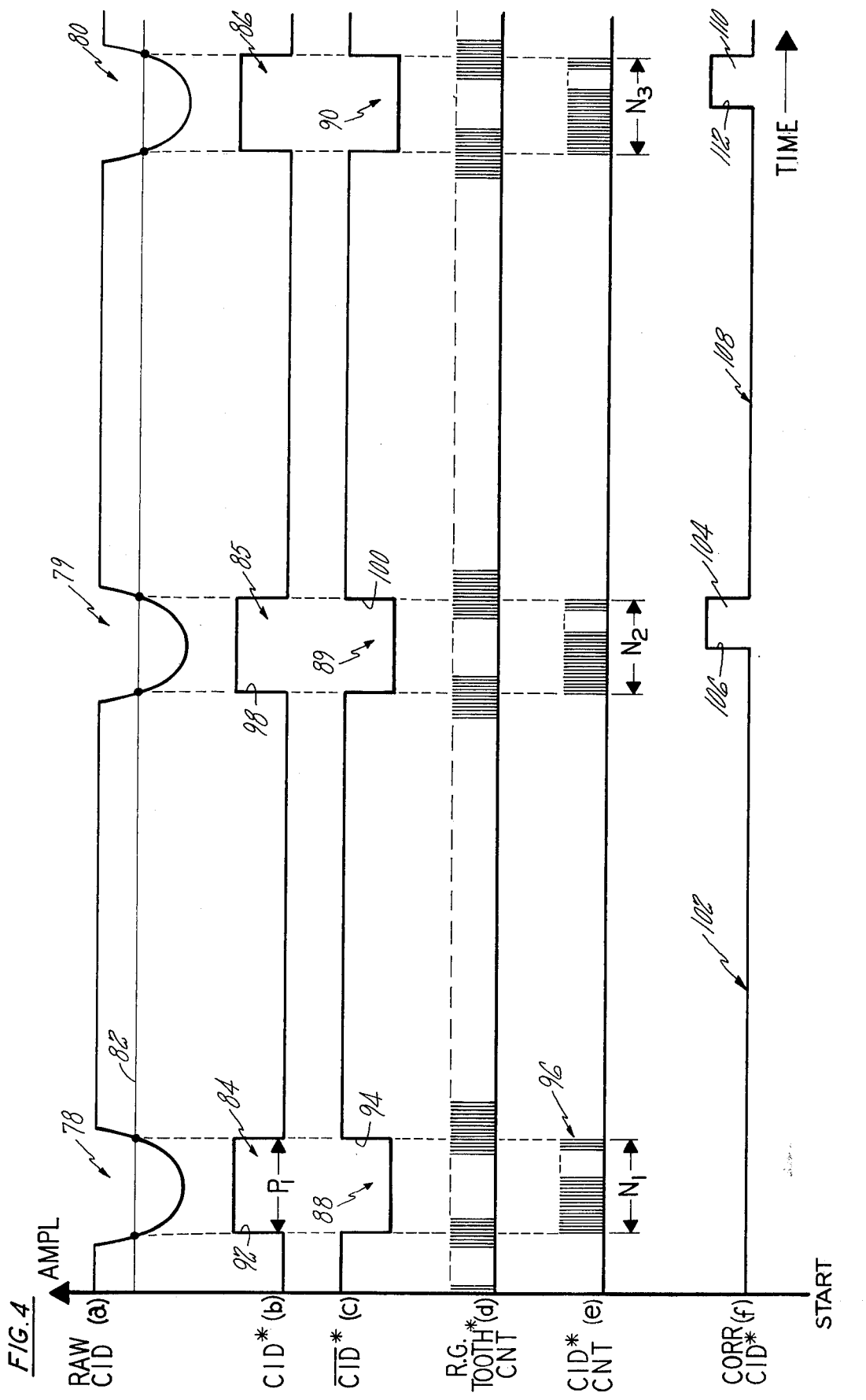

ENGINE, CYLINDER IDENTIFICATION (CID) TRANSDUCER

CROSS REFERENCE TO RELATED APPLICATIONS

The subject matter hereof is useful in conjunction with the subject matter disclosed in a commonly owned, copending application filed on even date herewith by Rackliffe et al, Ser. No. 684,033 entitled RELATIVE AND SUB-CYCLIC SPEED MEASUREMENTS FOR INTERNAL COMBUSTION ENGINE DIAGNOSTICS.

BACKGROUND OF THE INVENTION

1. Field of the Invention

This invention relates to signal transducers, and more particularly to an engine, cylinder identification (CID) transducer for providing a series of periodic signals each representative of the displacement of an engine cylinder piston through a reference piston position.

2. Description of the Prior Art

In the field of diagnostic testing of combustion engines, it is necessary to obtain information of the engine combustion cycle, to establish an engine time base reference from which the engine performance characteristics can be accurately determined. Such information can be obtained in a diesel engine by measurement of the periodicity of a selected cylinder, piston stroke through a reference piston position which is obtained by monitoring a member on an engine component whose function is cyclic and directly related to the cylinder piston stroke. The periodic displacement of the engine component member monitored is detected by a proximity sensor relatively disposed in an adjacent spatial region into which the displaced member of the cyclic engine component penetrates on successive cycles. The proximity sensor, being an inductive device, provides a magnetic field in the adjacent spatial region which is altered by the periodic penetration of the component member creating an induced sensor current and a signal having a peak amplitude in dependence on the closeness, or proximity of the component member to the sensor during its displacement cycle. The proximity sensor, therefore, provides a periodic signal whose period is directly related to the periodicity of the component member displacement, and whose occurrence is directly related to the cylinder piston stroke through a reference piston position, such as top dead center (TDC).

Such sensor signals are known as cylinder identification (CID) signals. Since the CID signal amplitude is dependent on the proximity of the sensor to the member during the penetration of the member into the sensor region, the sensor is carefully mounted and tested to insure a CID signal amplitude of sufficient magnitude to provide a suitable indication. However, the spatial distance between the sensor and the member changes after installation as a result of changing levels of engine vibration caused by the changing of the engine RPM during various diagnostic tests. The changing vibration levels create relatively low frequency cyclic distortion of the sensor supporting structure which results in a similar low frequency change in the amplitude and pulse width of the CID signals. In addition, a change in engine speed itself causes a change in signal pulse width and amplitude, an increase in speed resulting in a narrowed signal pulse width due to the increase in the component member RPM.

These changes in CID signal amplitude and pulse width due to engine speed changes and vibration levels result in a non-repeatable CID detection of piston position. While the non-repeatability error may be relatively small and tolerable for many applications, the inaccuracies due to the non-repeatability are unacceptable in modern engine diagnostic systems which require accurate engine time base information to provide the required overall system accuracy for engine performance measurements and evaluation.

SUMMARY OF THE INVENTION

The object of the present invention is to provide an engine cylinder identification (CID) transducer for providing a signal indication which is representative of a selected cylinder piston position, and which is repeatable for successive cylinder cycles over a wide range of engine vibration levels and engine RPM.

According to the present invention, a selected cylinder piston stroke through a reference piston position is determined by detecting the periodic displacement of an engine component member having a cyclic function directly related to the piston stroke of the engine cylinder with a proximity sensor disposed adjacent to an area through which the component member is periodically displaced. The sensor provides a series of cylinder identification (CID) signal pulses, each having a peak amplitude in dependence on the spatial distance between the sensor and the member at that position in its displacement cycle at which it is in close proximity to the sensor, the series having a period in dependence on the periodicity of the member displacement cycle, the occurrence of each CID signal pulse being directly related to, and representative of the piston stroke through a reference piston position. Each CID signal is detected and signal conditioned to provide a conditioned CID (CID*) signal and its complement $\overline{\text{CID}^*}$ signal, the interval between the leading edges of each defining a CID interval over which a plurality of tooth signals, provided by proximity sensing of the ring gear teeth of the engine flywheel assembly which rotates at an angular velocity representative of the engine RPM, are counted to provide a total tooth count for the CID interval which is divided by two and stored for one full period of the sensor CID signal. The instantaneous tooth count provided during an immediately succeeding CID interval is continuously compared with the stored half tooth count from the preceding interval in a magnitude comparator, which provides a discrete output signal when the instantaneous tooth count from the immediately succeeding CID interval exceeds the stored half tooth count from the preceding CID interval, the leading edge of the discrete signal representing the displacement of the cylinder piston through the reference piston position.

In the engine CID transducer according to the present invention, the inherent inaccuracies of the CID sensed signal resulting from engine speed changes and changing vibration levels are eliminated by counting the number of ring gear tooth signals in each CID interval. Since the ring gear assembly rotates at the engine RPM, changes in engine speed do not affect the total number of counts in each CID interval, since an increase in speed which decreases the CID signal width simultaneously increases the number of tooth signals appearing in the decreased CID interval by a corresponding amount such that an equal number of tooth counts are provided in each successive CID interval despite the engine speed changes. This eliminates the error in CID detection accuracy due to changes in engine speed. Similarly, the changes in CID signal magnitude and pulse width resulting from changes in the spatial distance between the proximity sensor and the displaced member resulting from engine vibration are accounted for by comparing the tooth counts from a present CID interval with one-half the tooth counts from an immediately preceding interval. Since the time between comparisons is equal to the CID signal period, which is much smaller than the period of the vibration distortions, the vibration distortion appears constant on successive CID intervals and is factored out by the tooth count comparison to provide a corrected CID signal which is immune from engine vibration noise.

Other objects, features and advantages of the present invention will become more apparent in the light of the following detailed description of a preferred embodiment thereof, as illustrated in the accompanying drawing.

BRIEF DESCRIPTION OF THE DRAWING

FIG. 4 is an illustration of selected signal processing functions performed by the illustrative embodiment of FIG. 1.

DESCRIPTION OF THE PREFERRED EMBODIMENT

Figure 2:
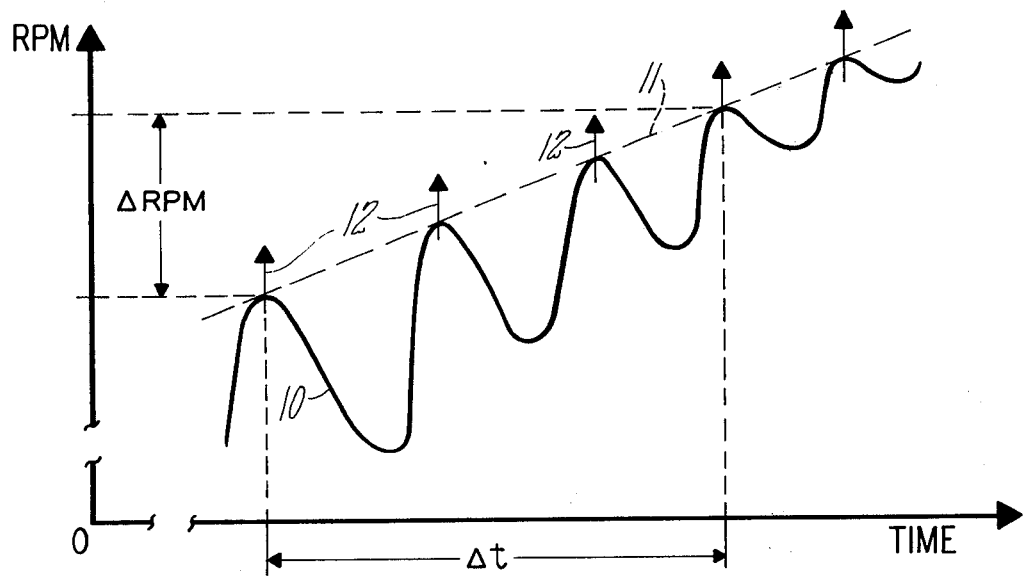
FIG. 2 is an illustration of an engine cylinder RPM versus time for an engine in the acceleration mode, as used in the description of the embodiment of FIG. 1.

One of the fundamental engine parameters measured by a diagnostic system is horsepower, which is determined by a measurement of the change in engine RPM over a determined time interval (H.P. = $\Delta RPM/\Delta t$). FIG. 2 is an illustration of engine (RPM) versus time ($t$) for a one cycle, two stroke engine in the acceleration mode, with a typical cylinder RPM response shown by a curve 10 which illustrates the peak and valley RPM values of the cylinder occuring around an increasing average RPM value 11 as the engine is accelerated. To accurately measure the engine horsepower it is necessary to measure a start RPM value and a stop RPM value each occurring at a consistent point on successive cylinder cycles in order to provide a true average $\Delta RPM$ value. This is difficult due to the inability in determining repeatable points on the curve 10 due to the decreasing periodicity and amplitude of the cylinder stroke cycle during acceleration. A desirable reference point for each cylinder cycle is the peak RPM value point of each cycle, shown generally by the vectors 12. This peak RPM value is a function of the cylinder piston position and may be determined by monitoring an engine member whose function is cyclic and which is directly related to the piston stroke, such as a rocker arm assembly which controls the intake and exhaust valves of the cylinder. The rocker arm cyclic displacement is directly related to the piston cyclic displacement, and the relationship of an instantaneous rocker arm position to an instantaneous position of the cylinder piston, such as top dead center (TDC), may be determined for any given engine model. As stated hereinbefore, a proximity sensor is used to provide a CID signal representative of the piston position, and the CID signal inaccuracies due to changes in engine speed and a vibration are shown in FIG. 3.

Figure 3:
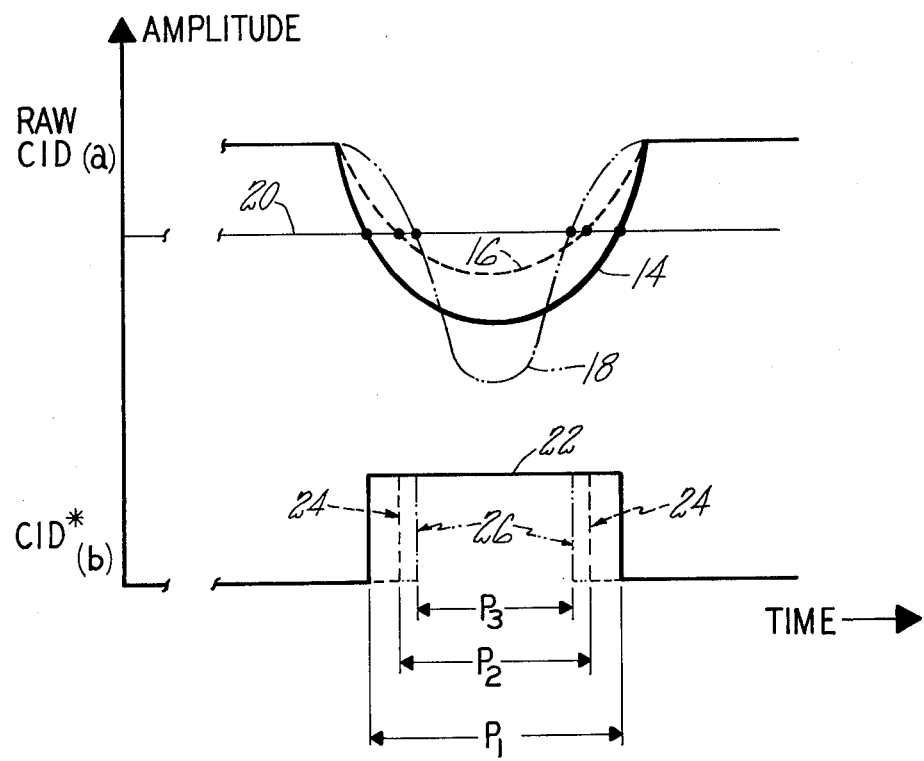
FIG. 3 is an illustration of a proximity sensor CID signal response used in the description of the embodiment of FIG. 1.

Referring now to FIG. 3, illustration (a), in a typical family of signal responses for a single CID signal pulse, a nominal pulse is shown by a curve 14. A change in engine ambient vibration condition causes the sensor to change its spatial distance relationship with the engine member, and an increase in distance results in a diminished amplitude and pulse width signal shown by a dashed curve 16 (a decrease in distance results in an increased amplitude and pulse width). Similarly, an acceleration in engine speed above idle causes the sensor signal to provide a response having a narrower pulse width and higher amplitude, as shown by a phantom curve 18. These changes in the sensor CID signal response provide different response characteristics when the raw CID signal of illustration (a) is processed through a threshold detector and signal conditioner, which provides a threshold level 20, and which responds to sensor signal amplitudes less than the threshold value to provide a conditioned CID signal, or CID*. Referring now to FIG. 3, illustration (b), a CID* signal 22 has a fixed amplitude to provide compatible signal interfacing with subsequent signal processing equipment, such as $T^2L$ logic. The pulse width (P) of the condition signal is determined by the crossover points of the raw CID signal and the threshold level, such that for the CID signal 14 of illustration (a), the CID* pulse 22 has a pulse width $P_1$. The raw CID signals 16, 18 provide CID* signals 24, 26 having pulse widths, $P_2$, $P_3$ respectively. Therefore, due to changing engine conditions, successive CID* signals may have varying pulse widths which decrease the repeatability of the CID* representation of cylinder piston position. Since the engine horsepower is determined by measuring engine RPM at the selected piston position, the nonrepeatability of the CID* signal due to variations in the pulse width contribute undesirable inaccuracies in the engine horsepower measurement.

Figure 1:
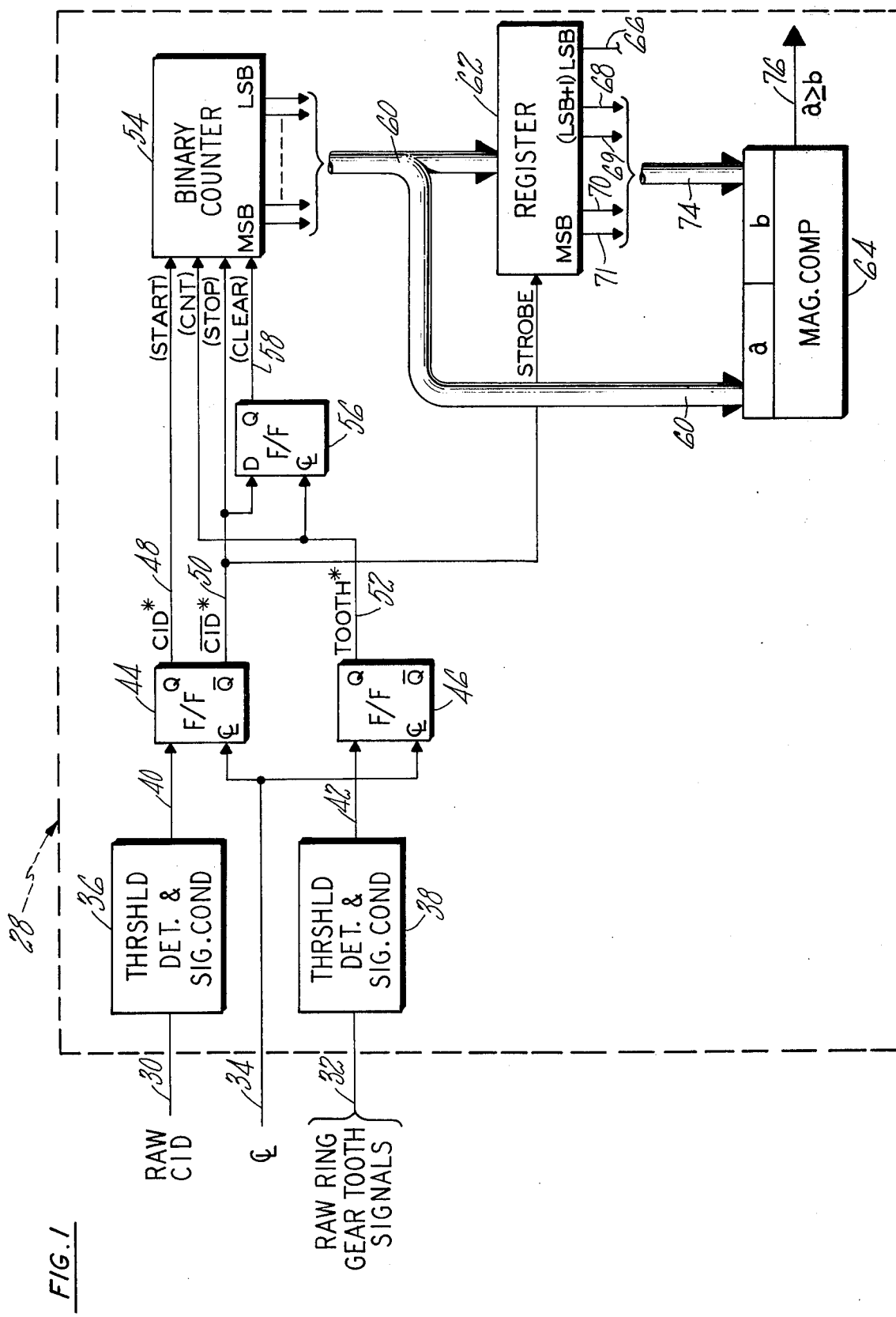
FIG. 1 is a system block diagram of an illustrative embodiment of an engine CID transducer according to the present invention.

Referring now to FIG. 1, in an illustrative embodiment of an engine, cylinder identification (CID) transducer 28 according to the present invention, the raw CID signals from a proximity sensor (not shown) are presented through a line 30 to the transducer 28. Signal information in the form of a series of pulse signals representative of the teeth on the ring gear assembly of the engine flywheel are similarly presented to the transducer 28 on a line 32. As may be known, the ring gear assembly is a integral part of the engine flywheel assembly and rotates at an angular velocity representative of the engine RPM. The ring gear is provided with gear teeth by the engine manufacturer to allow the flywheel to be initially engaged and be driven by a starter motor during engine start-up. By monitoring the ring gear circumference with a proximity sensor, similar to the one described hereinbefore with respect to the CID signal, a series of signal pulses is obtained, each representative of the tooth spacing of the ring gear teeth. Since each engine model ring gear has a designated number of gear teeth (from 92 to 152, at odd increments, with 118 being typical) which is unique to the given model, the number of teeth in a given time interval may be counted and used to determine the RPM of the flywheel assembly. An exemplary manner of deriving the gear tooth signal representations and the raw CID signal are disclosed in the hereinbefore cited, commonly owned, copending application filed on even date by Rackliffe et al, Ser. No. 684,033 entitled RELATIVE AND SUB-CYCLIC SPEED MEASUREMENTS FOR INTERNAL COMBUSTION ENGINE DIAGNOSTICS. A clock signal is also provided on the line 34 to the transducer 28 from the engine diagnostic system, to provide time synchronization between the diagnostic equipment and the transducer 28.

The raw CID signal and the raw gear tooth signals on the lines 30, 32 are presented to threshold detector and signal conditioner networks 36, 38 of a type well known in the art, and which may comprise a high gain operational amplifier such as the National Semiconductor LM101 operated as a high gain comparator which compares each of the respective signals on the lines 30, 32 to a corresponding threshold level to provide corresponding conditioned output signals. The network 36 provides a conditioned CID signal (CID*) through a line 40 to a bistable device 44, such as a leading edge triggered flip flop, the network 38 providing a conditioned gear tooth signal (tooth*) on a line 42 to a bistable device 46, similar to the device 44. Each of the bistabies 44, 46 are also provided with the clock signal on the line 34 at a clock input of each. The bistable 44 provides a time synchronized CID* signal on a line 48 and its complement $\overline{CID^*}$ signal on a line 50 (as shown in FIG. 4, illustrations (b), (c)). Similarly, the bistable 46 provides a time synchronized tooth* signal on a line 52 (as shown generally in FIG. 4, illustration (d)).

The CID* signal on the line 48 is presented to the START (enable) input of a binary counter 54 of a type well known in the art, such as a plurality of Texas Instrument SN74163 four bit binary counters connected in cascade. The $\overline{CID^*}$ signal on the line 50 is presented to a STOP (not enable) input of the counter 54, and to the signal input of a bistable device 56, such as a leading edge triggered flip flop similar to the bistables 44, 46. The tooth* signal on the line 52 is presented to the count input of the counter 54, and to the clock input of the bistable 56. As described in detail hereinafter, the counter 54 counts the number of tooth* pulses present within each successive CID interval, defined as the time interval between the START and STOP signals provided by the leading edge transitions of the CID* and $\overline{CID^*}$ signals respectively, and provides a succession of binary words, each representative of the total tooth count obtained in each successive CID interval, at its output. The binary word at the counter output is comprised of some number of bits, from a least significant bit (LSB) to a most significant bit (MSB), and is presented through a set of lines 60 to the input of a storage register 62, and to one set of inputs of a bit magnitude comparator 64. The storage register 62 and magnitude comparator 64 are each of a type well known in the art, and the comparator 64 may comprise a plurality of Texas Instrument SN7485 four bit magnitude comparators connected in cascade. The storage register 62 also receives the $\overline{CID^*}$ signal on the line 50 at a STROBE input, and at the leading edge of each $\overline{CID^*}$ signal, the binary word on the line 60 representative of the total tooth count of a present CID interval is strobed through the register to its output stage. The register output includes an LSB bit 66, and a plurality of more significant bits 68-71 from a second least significant bit (LSB + 1) through an MSB. Only the more significant bits 68-71 of the register 62 are presented through a line 74 to a second input of the magnitude comparator 64. The LSB 66 of the register 62 is not presented to the comparator 64 resulting in a divide by two function, such that the signal on the line 74 represents one-half of the total tooth count on the line 60. The output of the magnitude comparator 64 is provided on a line 76 and represents a corrected CID* signal which transitions from a low state to a high state whenever the tooth count signal on the line 60 exceeds the half tooth count on the line 74, as described in detail hereinafter.

In the operation of the CID transducer 28 of FIG. 1, the threshold detector 36 receives the line 30 sensor CID signals 78-80, (FIG. 4, illustration (a)) which are compared to a threshold detector level 82 to provide a series of CID* signals 84-86 (FIG. 4, illustration (b)) through the bistable device 44 to the line 48. The bistable 44 simultaneously provides the complementary $\overline{CID^*}$ signals 88-90 (FIG. 4, illustration (c)) on the line 50. A leading edge 92 of the first CID* signal 84 (FIG. 4, illustration (b)) represents the beginning of a CID interval which starts the counter 54 which counts the tooth* signals (FIG. 4, illustration (d)) within the interval and provides an instantaneous tooth* count on the line 60. The CID interval ends with the appearance of a leading edge 94 of the $\overline{CID^*}$ signal 88, which stops the counter 54, and the total tooth* count ($N_1$) on the line 60 (represented quantatively by the envelope 96 of FIG. 4, illustration (e)) is strobed to the output stage of the register 62 and stored until a new binary count word is strobed in by the leading edge of a succeeding $\overline{CID^*}$ signal. In addition, the $\overline{CID^*}$ signal 88 high state level following the leading edge 94 provides an input signal to the bistable 56, which is clocked through the bistable to the line 58 on an immediately succeeding tooth* signal following the leading edge 94 to reset the counter 54 to a zero count. At the appearance of the immediately succeeding CID signal 79, the leading edge 98 of the CID* signal 85 again starts the counter 54 which counts the tooth signals appearing in the CID interval which ends with the rising edge 100 of the $\overline{CID^*}$ signal 89. The counter 54 provides the instantaneous tooth count for this immediately succeeding CID interval through the line 60 to the magnitude comparator 64, and the input of the storage register 62. The comparator 64 provides a low state signal 102 (FIGS. 4, illustration on the line 76 as long as the binary signal on the line 60 is less than that on the line 74 which, due to the divide by two function provided by selecting only the more significant bits 68-71 of the register 62, is equal to the equivalent $N_1/2$ count stored from the preceding cycle. The comparator 64 provides a high state signal 104 on the line 76 when the instantaneous count on the line 60 exceeds the quantity $N_1/2$ on the line 74, of which a leading edge 106 represents a true or corrected CID* signal manifestation of the stroke of the cylinder piston through the selected reference piston position. At the leading edge 100 of the $\overline{CID^*}$ pulse 89 (FIG. 4, illustration (c)), the counter stops counting, and the total count $N_2$ on the line 60 is strobed through the register 62 to the line 74 where it appears as $N_2/2$. On the leading edge of the first tooth pulse appearing after the leading edge 100, the counter is reset to zero by the bistable 56 and the comparator 64 provides a low state signal 108 on the line 76. The process continues through successive CID intervals, such that for the CID signal 80, the comparator 64 compares the $N_2/2$ equivalent binary signal on the line 74 with the instantaneous tooth count for the CID* pulse 86, and provides a line 76 high state signal 110 with a leading edge 112 representing the true CID* manifestation when the count on the line 60 exceeds the $N_2/2$ count on the line 74.

Since the engine CID transducer 28 provides the corrected CID* signal by comparing the instantaneous tooth count in a present CID interval with one-half of the tooth count in a immediately preceding interval, it requires at least one full CID interval to establish a count threshold for the magnitude comparator 64. Therefore, at initial turn on of the system, or at initial receipt of a raw CID signal from the engine, the transducer 28 has not established the reference count and the magnitude comparator 64 is incapable of providing a true or corrected CID* signal. Therefore one cycle of the piston is wasted to establish the start point reference for the transducer. Typically, the true CID* signals on the line 76 will not be monitored for some period of time after the system power is turned on, however, where system demand requires the absolute exclusion of any erroneous CID signal, suitable inhibiting circuitry may be provided to prevent the magnitude comparator 64 from providing such an incorrect signal. Although not shown in FIG. 1, such inhibiting may comprise a one shot monostable which provides an inhibit signal to the magnitude comparator 64 for a determined time interval after the power is applied to the transducer 28. Such an inhibit, known as a power on delay, is well known in the art.

Since the number of counts obtained in each CID interval is dependent on both the velocity of the ring gear assembly (which is related to the engine RPM), and to the width of the CID interval (which similarly decreases as a function of increased engine RPM), an increase in RPM above engine idle results in an equal number of counts on successive CID intervals. The angular velocity of the ring gear tooth assembly increases and therefore provides more tooth signals per unit time while the CID interval correspondingly diminishes as a function of the increased speed, such that the true CID* signal on the line 76 remains unaffected by the engine RPM changes, and appears at a repeatable periodic interval regardless of engine RPM. Similarly the change in sensor CID signal pulse width and amplitude due to the spatial change in distance of the proximity sensor from the monitored engine component resulting from changing engine vibration levels does not affect the true CID* signal manifestation which is obtained by comparison of tooth counts on successive CID intervals. These successive CID intervals occur at the CID signal period which is much smaller than the period of the vibration distortion, such that the vibration distortion appears constant on successive CID intervals and is factored out by the comparison of the full count to the half count on successive CID intervals. Therefore, the engine CID transducer 28 of the present invention provides a true CID* signal manifestation which is unaffected by the dependence of the raw CID signal pulse width on both engine RPM and engine vibration levels, thereby providing an accurately repeatable, true CID* signal manifestation of the selected cylinder piston position, which in turn provides an accurate engine cycle time base reference from which various engine operating criteria may be measured.

Similarly, although the invention has been shown and described with respect to an illustrative embodiment thereof, it should be understood by those skilled in the art that the foregoing and various other changes, omissions and additions in the form and detail thereof may be made therein without departing from the spirit and the scope of this invention.

Having thus described a typical embodiment of my invention that which I claim as new and desire to secure by Letters Patent is:

1. In an engine diagnostic system of the type which monitors the operation of a combustion engine and provides signal information representative of the engine operating performance characteristics, the signal information including a series of sensed, periodic cylinder identification (CID) signal pulses representative of the stroke of an engine cylinder piston through a reference piston position as provided by a sensor in response to the cyclic displacement of an engine component member having a cyclic function directly related to the piston stroke of the cylinder, each CID pulse having a pulse width in dependence on the spatial distance between the sensor and the member during its cyclic displacement and on the period of the member displacement cycle which is related to the instantaneous revolutions per minute (RPM) of the engine, the signal information further including a series of tooth signal pulses, each representative of a corresponding one of a plurality of gear teeth disposed on the ring gear assembly of the engine flywheel housing, the tooth signal pulse frequency being dependent on the engine RPM; an engine cylinder identification (CID) transducer for providing a CID signal manifestation of the stroke of an engine cylinder piston through a reference piston position which is not dependent on the spatial distance between the sensor and the engine component member or on the engine RPM, comprising:

detection means, responsive to the series of sensed CID signals, for providing a series of CID gate signals, one for each of the sensed CID signals, each having a time duration in dependence on the pulse width of a corresponding sensed CID signal, the time duration of each representing a CID interval;

counting means, responsive to said CID gate signals and to the series of tooth signal pulses, for providing an instantaneous tooth count signal having a magnitude representative of the instant number of tooth signal pulses present within a given one of said CID intervals, and for providing a total tooth count having a magnitude representative of the total number of tooth signal pulses present within each of said CID intervals; and signal generator means, connected for response to said counting means, for providing a signal manifestation whenever the instantaneous tooth count signal magnitude from a present CID interval exceeds one-half of the total tooth count signal magnitude from an immediately preceding CID interval, said signal manifestation being representative of the stroke of the cylinder piston through the reference piston position.

2. The engine CID transducer of claim 1, wherein said signal generator means comprises:

storage register means, connected for response to said counting means, for storing the total tooth count signal from each of said CID signal intervals for a time duration in dependence on the presence of a total tooth count signal from an immediately succeeding CID interval;

dividing means, responsive to the stored total tooth count signal from said storage register means; for providing a signal representative of one-half of the magnitude of the stored total tooth count signal; and comparator means, connected for response to said counting means and to said dividing means, for comparing the instantaneous tooth count signal for each of said CID intervals with one-half of the total tooth count from an immediately preceding one of said CID intervals, and for providing said signal manifestation in response to an instantaneous tooth count signal magnitude from a present CID interval exceeding one-half of the magnitude of the total tooth count signal from an immediately preceding CID interval.

3. In an engine diagnostic method of the type which monitors the operation of a combustion engine and provides signal information representative of the engine operating performance characteristics, the signal information including a series of sensed, periodic cylinder identification (CID) signal pulses representative of the stroke of an engine cylinder piston through a reference piston position as provided by a sensor in response to the cyclic displacement of an engine component member having a cyclic function directly related to the piston stroke of the cylinder, each CID pulse having a pulse width in dependence on the spatial distance between the sensor and the member during its cyclic displacement and on the period of the member displacement cycle which is related to the instantaneous revolutions per minute (RPM) of the engine, the signal information further including a series of tooth signal pulses, each representative of a corresponding one of a plurality of gear teeth disposed on the ring gear assembly of the engine flywheel housing the tooth signal pulse frequency tooth signal pulse being dependent on the engine RPM; the method of providing a CID signal manifestation of the stroke of an engine cylinder piston through a reference piston position which is not dependent on the spatial distance between the sensor and the engine component member or on the engine RPM, comprising the steps of:

detecting the series of sensed CID signals to provide a series of CID gate signals, one for each of the sensed CID signals, each having a time duration in dependence on the pulse width of a corresponding sensed CID signal, the time duration of each representing a CID interval;

counting the tooth signal pulses present within each of said CID intervals, to provide an instantaneous tooth count signal having a magnitude representative of the instant number of tooth signal pulses present within each of said CID intervals, and to provide a total tooth count signal having a magnitude representative of the total number of tooth signal pulses present within each of said CID intervals; and providing a signal manifestation whenever the instantaneous tooth count signal magnitude from a present CID interval exceeds one-half of the total tooth count signal magnitude from an immediately preceeding CID interval, said signal manifestation being representative of the stroke of the cylinder piston through the reference piston position.

4. The method of claim 3, wherein the step of generating said signal manifestation comprises the steps of:

storing the total tooth count signal from each of said CID intervals until the presence of a total tooth count signal from an immediately succeeding CID interval;

dividing each of said stored total tooth count signals by a factor of two to provide for each, a signal representative of one-half of the magnitude of said stored total tooth count signal; and comparing the instantaneous tooth count signal for each of said CID intervals with one-half of the total tooth count from an immediately preceding CID interval, and providing said signal manifestation whenever the instantaneous tooth count signal magnitude from a present CID interval exceeds one-half of the total tooth count signal magnitude from an immediately preceding CID interval.

* * * * *